J. W. SMITH.
TIMBER FELLING AND SAWING MACHINE.
APPLICATION FILED FEB. 23, 1906.
935,128.
Patented Sept. 28, 1909.
6 SHEETS—SHEET 2.
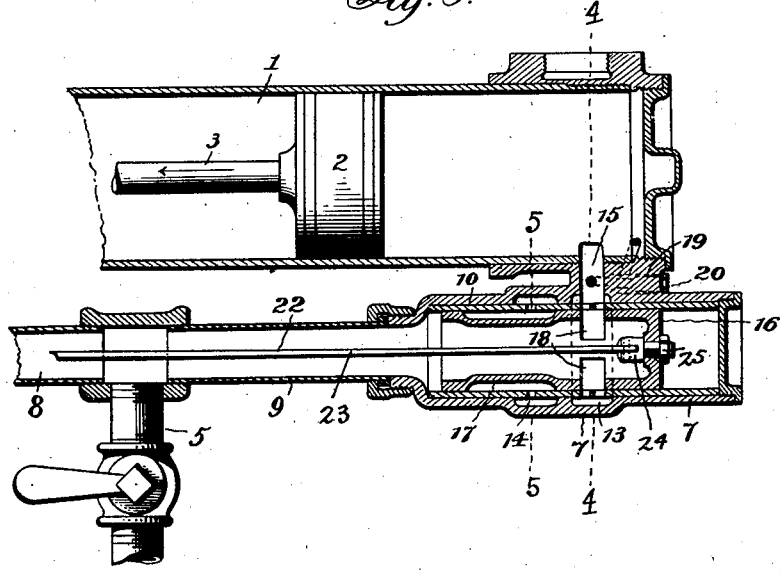
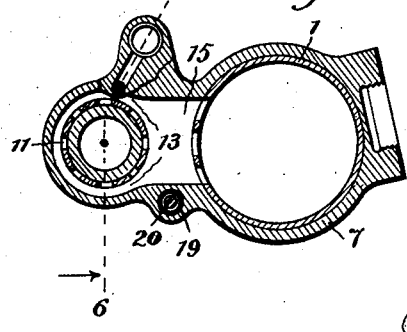
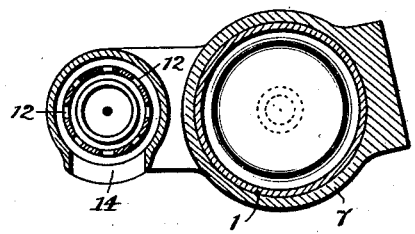
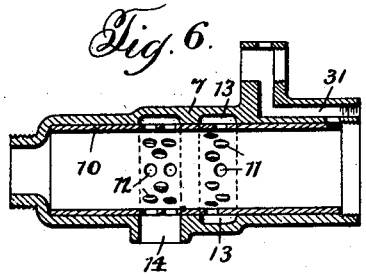
Witnesses:
Jas. E. Hutchinson.
J. L. Lawlor.
Inventor
Joseph W. Smith,
by Prindle and Williamson
Attorneys.

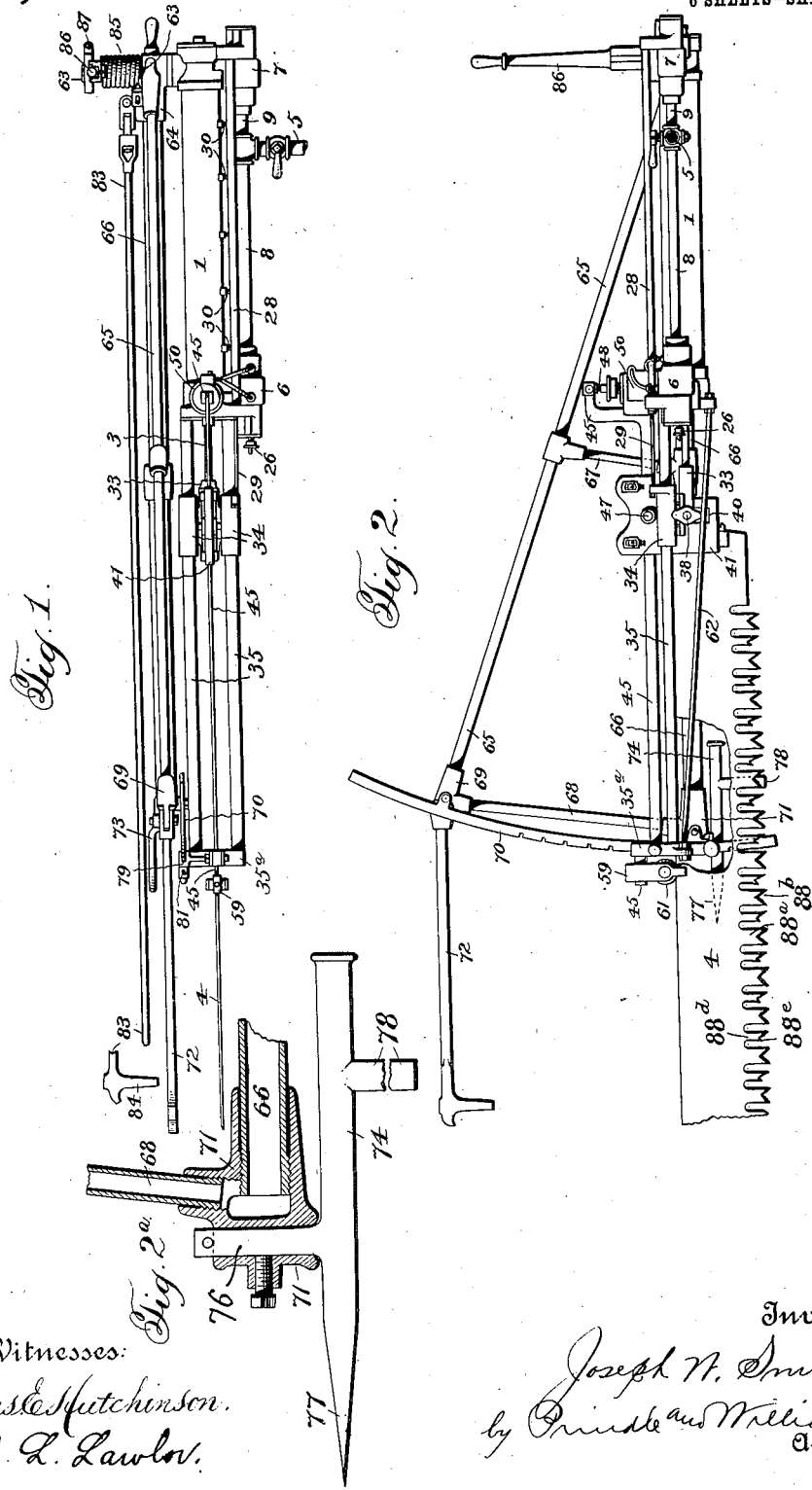

J. W. SMITH.
TIMBER FELLING AND SAWING MACHINE.
APPLICATION FILED FEB. 23, 1906.
935,128.
Patented Sept. 28, 1909.
6 SHEETS—SHEET 3.
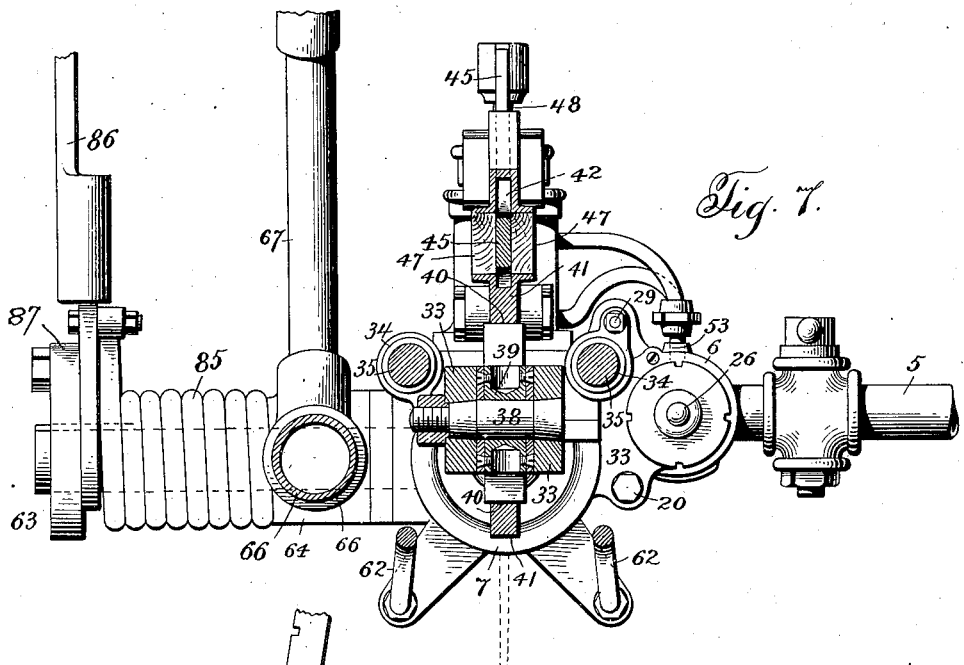
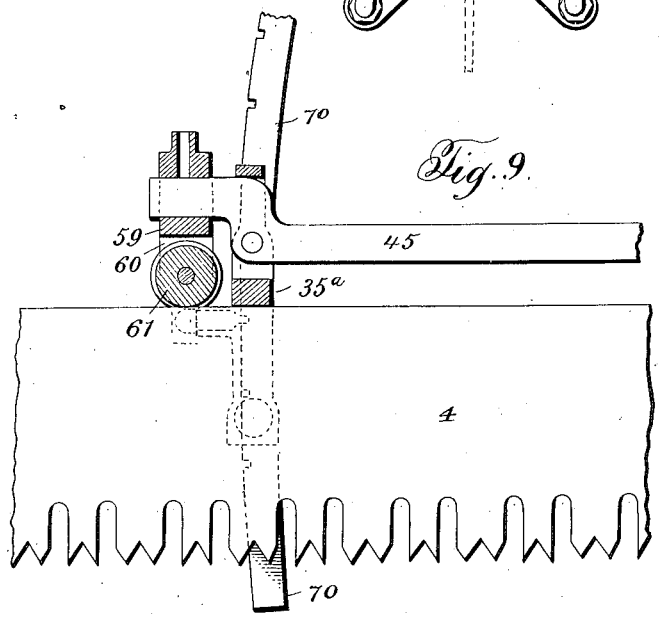
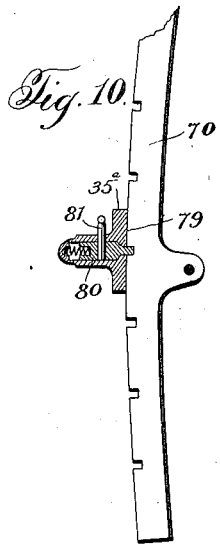
Witnesses
Jas. E. Hutchinson
J. L. Lawlor
Inventor
Joseph W. Smith,
by Prindle and Williamson
Attorneys

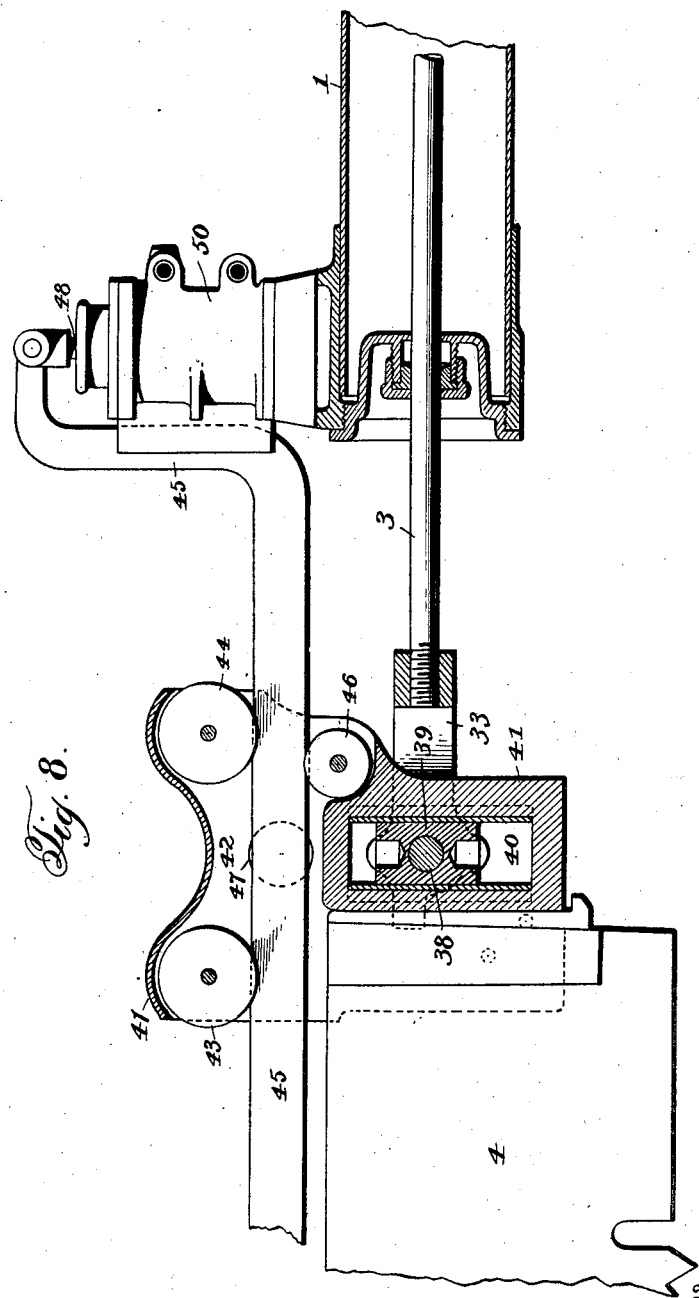

J. W. SMITH.
TIMBER FELLING AND SAWING MACHINE.
APPLICATION FILED FEB. 23, 1906.

935,128. Patented Sept. 28, 1909.
6 SHEETS—SHEET 5.

Witnesses
Jas E Hutchinson.
J. L. Lawlor.

Inventor
Joseph W. Smith,
by Prindle and Williamson
Attorneys.

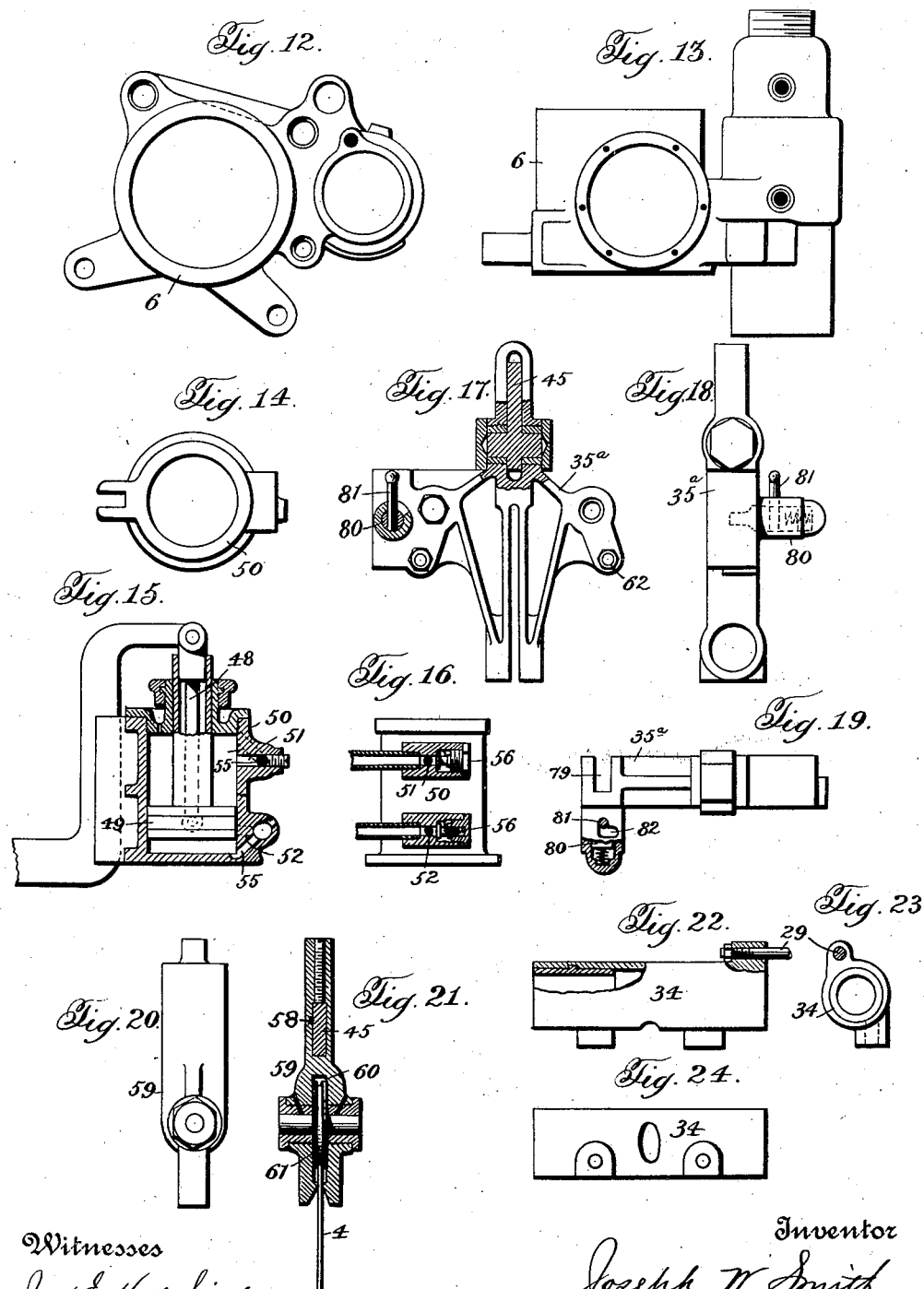

UNITED STATES PATENT OFFICE.

JOSEPH W. SMITH, OF PORTLAND, OREGON.

TIMBER FELLING AND SAWING MACHINE.

935,128. Specification of Letters Patent. Patented Sept. 28, 1909.

Application filed February 23, 1906. Serial No. 302,483.

*To all whom it may concern:*

Be it known that I, JOSEPH W. SMITH, of Portland, in the county of Multnomah, and in the State of Oregon, have invented a certain new and useful Improvement in Timber Felling and Sawing Machines, and do hereby declare that the following is a full, clear, and exact description thereof, reference being had to the accompanying drawings, in which—

Figures 11, 11A:
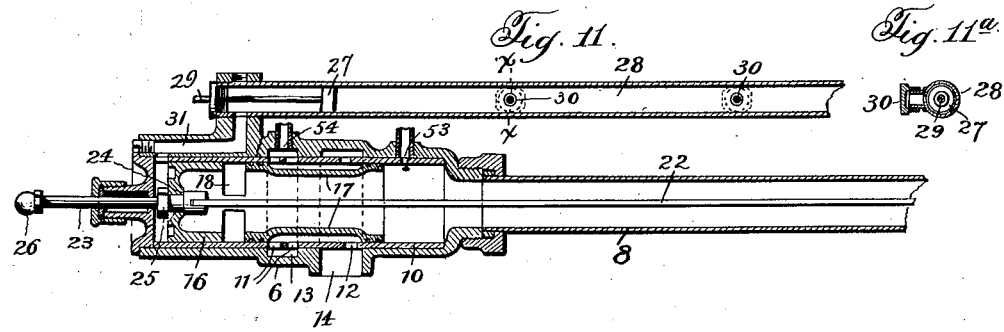
Figure 25:
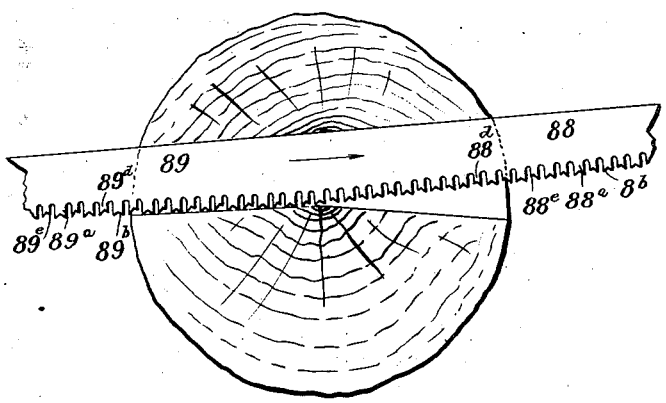
Figure 26:
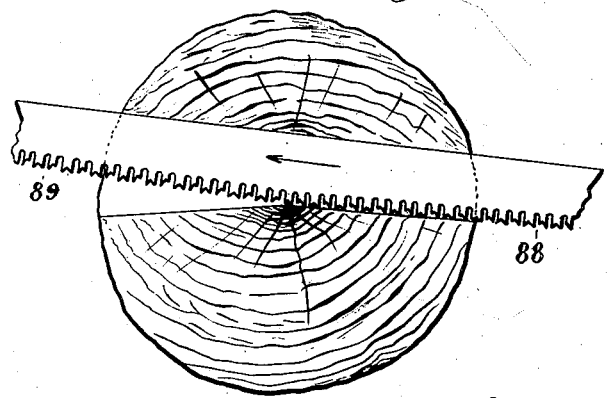

Figures 1 and 2 are, respectively, a top plan view and a side elevation of a timber felling and sawing machine embodying my invention; Fig. 2ª a detail view of the log-engaging dog; Fig. 3 is a partial, horizontal, sectional view of one end of the cylinder and the adjacent valve box of such machine; Figs. 4 and 5 are transverse sectional views of Fig. 3 on the lines 4—4 and 5—5 of Fig. 3, respectively; Fig. 6 is a sectional view taken on the line 6—6 of Fig. 4; Fig. 7 is a vertical sectional view taken on a plane through the cross-head pin and looking rearward; Fig. 8 is a partial, vertical sectional view of the forward end of the cylinder, the cross-head and adjacent parts; Fig. 9 is a detail, partly in vertical section, showing a portion of the saw, one of the saw guides, and the sector for supporting the saw guide; Fig. 10 is a detail of the sector and its locking bolt; Fig. 11 is a partial vertical sectional view through the forward valve chest and the valve-operating cylinder and piston; Fig. 11ª is a cross section on the line x—x of Fig. 11; Figs. 12 and 13 are, respectively, an end elevation and a plan view of the casting forming a cylinder head and valve chest; Figs. 14, 15 and 16 are, respectively, a plan view, and vertical sectional views of the cylinder for tipping the saw at each end of the stroke; Figs. 17, 18 and 19 are, respectively, a front and a side elevation, and a plan view of the bracket at the forward end of the saw guides partly in section; Figs. 20 and 21 are, respectively, a side elevation, and a vertical transverse sectional view of the block at the forward end of the tilting saw guide; Figs. 22, 23 and 24 are, respectively, a side elevation (partly in section), an end elevation of one of the guide boxes for the cross-head and a bottom view; and, Figs. 25 and 26 are views showing the position of the saw on the forward and back strokes of the saw, respectively.

The object of my invention has been to produce a sawing machine which shall have, among others, the following advantages: that of being adapted to be operated either by compressed air or steam; that of being capable of sawing trees of larger diameter than the length of the stroke of the saw; that of being compact and readily handled, and of being readily controlled, and to such ends,—my invention consists in the sawing machine hereinafter specified.

In carrying my invention into practice, I provide a cylinder 1 having in it a piston 2 whose piston rod 3 drives the saw 4. The fluid, either air or gas, is supplied to the cylinder 1 through a pipe 5, the latter communicating with valve chests 6 and 7, respectively, by pipes 8 and 9, respectively. The valve chest 6 has a bushing 10 mounted therein, which bushing communicates by series of holes 11 and 12, respectively, with supply and exhaust passages 13 and 14, respectively. The supply passage 13 communicates, by a port 15, with one end of the cylinder 1. A piston valve 16 fits within the bushing 10, and it has a neck 17, which is adapted to connect the supply and exhaust ports 13 and 14, and has openings 18, by which live air can pass from its interior to the supply port 15. Within the valve chest 7 is a passage 19 leading from the supply port 15 to a point near the cylinder head in the cylinder 1, a check valve 20 being interposed in such passage to permit air to pass from the supply port toward the cylinder, but to prevent air from passing in the reverse direction. The valve chest 7 is constructed, so far as described, precisely like the valve chest 6, except that the position of the parts is reversed. The valves in the chests 6 and 7 are connected by a rod 22 that is pivoted at each end to a stem 23, the latter having a shoulder 24 against which the valve is clamped by a nut 25. A handle 26 is secured to one of the stems 23 and passes outward toward a stuffing box, where it can be grasped for moving the valves manually, when that is necessary. The valves are moved automatically when the machine is once in operation by a piston 27 that is mounted in a tube or cylinder 28, the latter being supported at each end in the valve chests 6 and 7, respectively. The piston 27 is driven by a rod 29 from parts connected with the saw, as hereinafter described, and its function is to compress air at the opposite ends of the tube 28. The amount of air compressed is determined by relief valves 30 mounted on the tube 28, the compression at each end of the cylinder commencing at the point where one of the valves 30 is closed. The air compressed in the opposite ends of the tube 28 passes by passages 31 to the ends of the valve chests 6 and 7, and serves to actuate each valve at the end of each stroke of the saw, the motion of one valve being communicated to the other by the stem 22.

The piston rod 3 of the piston 2 passes through a stuffing box in the head of the cylinder 1, and is secured in a cross-head 33. The latter is provided with guide boxes 34 which embrace guide rods 35 that are secured in the casting forming the cylinder head and valve box 6, and that at their opposite ends are secured in a frame 35$^a$. The piston rod 29 of the piston 27 is also secured to said cross-head. A pin 38 is mounted in the said cross-head, and has swiveled upon it a block 39, which block is guided in a vertical slot 40 in a saw carrier 41. The latter has the saw 4 secured in a vertical slot therein. The saw carrier 41 has a vertical longitudinal slot 42, in which are journaled two rollers 43 and 44 that rest upon the upper edge of the guide rod 45, later referred to. The saw carrier 41 also has in the slot 42 an anti-friction roller 46, which bears on the underside of the guide rod 45. The saw-carrier 41 also has wooden plugs 47 driven into sockets in its sides and bearing against the sides of the guide rod 45 to prevent too free movement of the saw. The guide rod 45 is pinned at its rear end in the yoke of a piston rod 48, the latter being connected with a piston 49 in a vertical cylinder 50 that is mounted upon the casting forming the valve chest 6. The cylinder 50 has ports 51 and 52 which are connected by small pipes with openings 53 and 54 in the valve chest 6, the opening 53 being uncovered when the valve is in exhaust position, and the opening 54 being supplied with live air when the port 15 is supplied by the valve, so that at each stroke of the piston 27 the piston 49 is shifted from one end to the other of the cylinder 50.

In order to prevent the piston 49 from sticking at either end of the cylinder 50, or from striking against such cylinder, the following arrangement is provided:—A passage 55 connects the end of the cylinder with the port 51 or 52, and a check valve 56 is interposed in such port to permit the passage of air into the cylinder through the passage 55, but to prevent the passage of air out of the cylinder through such passage. The forward end of the guide bar 45 passes through a slot in the frame 35$^a$ being pivoted on a pin therein, and is secured in a slot 58 in a block 59, said block having a slot 60 in which is mounted an anti-friction roller 61 that bears upon the upper edge of the saw. The frame 35$^a$ is not only connected with the cylinder head by the guide rods, but also by brace-rods 62. At the rear end of the machine a shaft 63 is secured transversely in the casting forming the valve chest 7 and cylinder head, and upon such shaft is swiveled a bracket 64, which latter has connected to it tubes or braces 65 and 66, respectively, that extend toward the saw, diverging from each other. The braces 65 and 66 are preferably connected at an intermediate point by a cross-brace 67, and at their ends by a brace 68. A bracket 69 connects the braces 68 and 65, and has secured to it a sector 70, the sector also being connected with the bracket 71 which connects the braces 66 and 68. The bracket 69 has pivoted to it a dog 72 which can be driven into the tree or log to be sawed, a clamp, 73, being provided for securing the dog in adjusted position. A dog 74 is provided which has a horizontal tooth 77 adapted to be driven into the tree or log, a vertical handle 78 by which the dog can be withdrawn, and a vertical stem 76 that is adapted to be received into a socket in the bracket 71. The dog is first driven into the log and the bracket 71 is then seated over the stem 76. The sector 70 passes through a slot 79 in the frame 35$^a$, and a spring bolt 80 is mounted in a socket on such frame, so that its nose may be engaged with notches in said sector. The bolt 80 is provided with a cross-pin 81, which coöperates with an L-shape slot 82 in its socket, by which the bolt can be locked back, or can be allowed to engage the sector. The bracket 64 has swiveled to it a brace 83 carrying a dog 84 by which the machine can be braced laterally.

On the shaft 63 a spring 85 is coiled, one end being secured to the bracket 64, and the opposite end to a hand-lever 86, the latter being mounted upon the said shaft. A clamp 87 is provided for securing the hand-lever in any desired position, so that any desired amount of tension may be put upon the spring 85.

While any desired saw may be used with my machine, I prefer to use the saw illustrated, which saw has two oppositely directed series of teeth 88 and 89, said series of teeth extending in lines that are oblique to each other. Each series of teeth consists of cutting teeth 88$^a$ or 89$^a$ having cutting edges 88$^b$ or 89$^b$, there being a drag or raker tooth 88$^d$ or 89$^d$ having a short corner 88$^e$ or 89$^e$ to regulate the depth of the cut, and having a longer corner 88$^f$ or 89$^f$ to rake out the sawdust. The two series of teeth extend in straight lines, thus allowing each cutting tooth of the entire series to cut so long as it is within the circumferences of the tree or log being cut.

In the operation of my machine, the dog 74 is first driven into the tree, and the frame is dropped over it, so that its stem 76 is received in the socket in the bracket 71. The dog 72 is also driven into the tree, after which the dog 84 is driven in for a lateral brace, and the frame is thus securely attached to the tree. The hand-lever 86 is then adjusted to give proper tension to the spring 85. Air is admitted through the pipe 5, and the valve handle 26 is utilized, if necessary, to shift the valve 16 to operative position. Air is admitted by said valves to one end of the cylinder 1, and exhausted from the other end thereof, and the piston 2 is driven to one end of its cylinder. As such piston passes the port 15, it closes such port and compresses the remaining air in the cylinder, the check valve 20 preventing its escape through the port which communicates between the end of the cylinder and the supply port 15. The piston 2 is thus cushioned and prevented from striking the head of the cylinder, and is left in good position to be started toward the other end of the cylinder. The movement of the cross-head caused by the piston causes the piston 27 to compress air in the tube 28, and to force air into one or the other of the valve chests 6 or 7, and thus to shift one or the other of the piston valves 16. The supply port 15 at the end where the piston 2 then is, is thus uncovered, and live air flows through the check valve and through the passage leading to the end of the cylinder and starts the piston back until it has passed the supply port 15, when air passes directly through such supply port and carries the piston to the opposite end of its cylinder. By these means, the crosshead is reciprocated along the guide rods. The movements of the valve 16 at the forward end of the cylinder cause the piston 49 to raise or lower the rear end of the guide rod 45 at each end of the stroke of the crosshead. The tipping of the guide-rod 45 causes a consequent movement of the sawcarrier 41, such movement being permitted by the pin and block connection between the carrier and the cross-head. On the forward or outward stroke of the saw the guide bar 45 is so tipped as to bring the inner series of teeth into action, as illustrated in Fig. 25. When the end of this stroke has been reached, the saw, by the movement of such guide rod, is tipped, so as to bring the inner series of teeth into action, as illustrated in Fig. 26. The result is that, although each stroke be less than the diameter of the tree, the teeth will clear themselves of saw-dust, and every tooth will be cutting whenever it is in contact with the bottom of the saw-cut. A very rapid and effective cutting results from this method of operation.

The adjustable wooden plugs and the roller at the back of the saw perform an important office in supporting the saw in correct position and preventing its warping and buckling, their support being at the nearest practicable point to the log, and their adjustability enables them to be kept in the most efficient positions.

Having thus described my invention, what I claim is:—

1. In a sawing machine, the combination of a guide rod for the saw in its longitudinal reciprocations, mounted for movement crosswise of the lengthwise movement of the saw, a fluid pressure operated piston connected with said guide rod, a saw carrier mounted on said guide, and means to reciprocate said saw carrier.

2. In a sawing machine, the combination of a guide rod for the saw in its longitudinal reciprocation, means for moving said guide crosswise of the lengthwise movement of the saw consisting of a fluid pressure operated piston, means for automatically controlling the supply of fluid to said piston, a saw carrier mounted on said guide, and means to reciprocate said saw carrier.

3. In a machine of the class described, the combination of a frame having guides and having a cylinder, a piston mounted in said cylinder, a cross-head mounted on said guides and connected to said piston, said cross-head having a cross-head pin, a movable guide for the saw in its longitudinal reciprocation, a saw-carrier mounted on said movable guide, and a block swiveled on said cross-head pin and guided in said saw-carrier.

4. In a machine of the class described, the combination of a frame having guides and having a cylinder, a piston mounted in said cylinder, a cross-head mounted on said guides and connected to said piston, said cross-head having a cross-head pin, a movable guide for the saw in its longitudinal reciprocation, a saw-carrier mounted on said movable guide, a block swiveled on said cross-head pin and guided in said saw-carrier, and means for raising and lowering said guide.

5. In a machine of the class described, the combination of a frame having guides and having a cylinder, a piston mounted in said cylinder, a cross-head mounted on said guides and connected to said piston, said cross-head having a cross-head pin, a movable guide, a saw-carrier mounted on said movable guide, a block swiveled on said cross-head pin and guided in said saw-carrier, and means for raising and lowering said guide, said movable guide being pivoted near its forward end, said forward end being provided with a block having a roller adapted to rest upon the edge of the saw.

6. In a machine of the class described, the combination of a frame having guides and having a cylinder, a piston mounted in said cylinder, a cross-head mounted on said guides and connected to said piston, said cross-head having a cross-head pin, a movable guide, a saw-carrier mounted on said movable guide, a block swiveled on said cross-head pin and guided in said saw-carrier, and means for raising and lowering said guide, said saw-carrier having rollers adapted to engage the upper and lower edges of said movable guide.

7. In a machine of the class described, the combination of a frame having guides and having a cylinder, a piston mounted in said cylinder, a cross-head mounted on said guides and connected to said piston, said cross-head having a cross-head pin, a movable guide, a saw-carrier mounted on said movable guide, a block swiveled on said cross-head pin and guided in said saw-carrier, and means for raising and lowering said guide, said saw-carrier having rollers adapted to engage the upper and lower edges of said movable guide, and being provided with friction plugs adapted to rub on said movable guide.

8. In a machine of the class described, the combination of a frame having guides and having a cylinder, a piston mounted in said cylinder, a cross-head mounted on said guides and connected to said piston, said cross-head having a cross-head pin, a movable guide, a saw-carrier mounted on said movable guide, a block swiveled on said cross-head pin and guided in said saw-carrier, and means for raising and lowering said guide, said saw-carrier having rollers adapted to engage the upper and lower edges of said movable guide, and being provided with adjustable friction plugs adapted to rub on said movable guide.

9. In a machine of the class described, the combination of a frame, means for securing said frame to a tree or log to be sawed, a saw, means for reciprocating said saw, plugs adjustably connected with the saw, and a guide engaged by said plugs.

10. In a machine of the class described, the combination of a frame, means for securing said frame to a tree or log to be sawed, a saw, means for reciprocating said saw, means for tilting said saw at the end of each reciprocation, plugs adjustably connected with the saw, a guide against which said plugs bear, a roller adapted to bear against the back of the saw, and means for shifting said roller as the saw is rocked.

11. In a machine of the class described, the combination of a frame, means for securing said frame to a tree or log to be sawed, a saw, means for reciprocating said saw, plugs adjustably connected with the saw, a guide engaged by said plugs, and a roller adapted to bear against the back of the saw.

12. In a machine of the class described, the combination of a frame having guides, a cross-head movable on said guides, a piston rod connected to said cross-head, a cylinder and piston for moving said piston rod, a saw-carrier, a movable guide upon which said saw-carrier is mounted, a piston and cylinder for moving said movable guide, and valves adapted to admit fluid to both of said cylinders at each end of the saw stroke.

13. In a sawing machine, the combination of a guide for the saw in its longitudinal reciprocation, mounted for movement crosswise of the lengthwise movement of the saw, a saw carrier mounted on said guide, a cylinder and piston for reciprocating the saw carrier to give the saw its lengthwise movement, a piston and cylinder for giving the saw guide the said crosswise movement, and automatic means to control the supply of fluid to the cylinders at each end of the saw stroke.

In testimony that I claim the foregoing I have hereunto set my hand.

JOSEPH W. SMITH.

Witnesses:
CHAS. S. HAGUE,
TRUMAN J. GLOVER.